United States Patent [19]
Yoda et al.

[11] Patent Number: 5,698,847
[45] Date of Patent: Dec. 16, 1997

[54] OPTICAL-MODULATION-TYPE SENSOR AND PROCESS INSTRUMENTATION APPARATUS EMPLOYING THE SAME

[75] Inventors: Masaki Yoda, Yokohama; Tatsuyuki Maekawa; Shigeru Suzuki, both of Tokyo; Nobuaki Ohno, Yokohama, all of Japan

[73] Assignee: Kabushuki Kaisha Toshiba, Kawasaki, Japan

[21] Appl. No.: 579,246

[22] Filed: Dec. 27, 1995

[30] Foreign Application Priority Data

Dec. 27, 1994 [JP] Japan .................................. 6-325996

[51] Int. Cl.$^6$ ........................................ G02F 1/01
[52] U.S. Cl. ................... 250/225; 250/231.11; 324/96
[58] Field of Search .................... 250/227.17, 231.1, 250/231.11, 22.5, 237 G; 324/96, 76.36, 76.4; 369/44.17

[56] References Cited

U.S. PATENT DOCUMENTS

| | | | |
|---|---|---|---|
| 3,681,688 | 8/1972 | Hermstein et al. | 324/96 |
| 5,053,617 | 10/1991 | Kakizaki et al. | 250/231.1 |
| 5,153,427 | 10/1992 | Takahashi et al. | 250/231.1 |
| 5,165,045 | 11/1992 | Eselun | 250/237 G |

FOREIGN PATENT DOCUMENTS 61-186861  8/1986  Japan .
61-198019  9/1986  Japan .

OTHER PUBLICATIONS

J. At. Energy Soc. Japan, vol. 35, No. 2, pp. 1–9, Masanori ARITOMI, et al., "Various Pressure Measurement Technologies In Nuclear Engineering", Jan. 1993.

Primary Examiner—Que Le
Attorney, Agent, or Firm—Oblon, Spivak, McClelland, Maier & Neustadt, P.C.

[57] ABSTRACT

An optical-modulation-type sensor comprises an input condenser lens for collecting light from a light source, a polarizer for linearly polarizing the light from the input condenser lens, a light-transmissive piezo-oscillator which is provided with an oscillator circuit and to which the linearly polarized light is introduced from the polarizer, an analyzer for linearly polarizing the light from the piezo-oscillator, and an output condenser lens for converging the linearly polarized light from the analyzer. A process instrumentation apparatus using the sensor of the structure described above further comprises an optical fiber for transmitting the light from the light source to the optical-modulation-type sensor, a photoelectric converter operatively connected to an output side of the optical-modulation-type sensor for converting to an electrical signal the transmitted light which is intensity modulated with the oscillation frequency of the piezo-oscillator, and a signal processing unit for acquiring a process quantity based on the frequency of an output signal from the photoelectric converter.

28 Claims, 8 Drawing Sheets

OPTICAL-MODULATION-TYPE SENSOR AND PROCESS INSTRUMENTATION APPARATUS EMPLOYING THE SAME

BACKGROUND OF THE INVENTION

The present invention relates to an optical-modulation-type sensor for use in process instrumentation for measuring temperature and/or pressure in a plant such as a manufacturing plant or electric power plant and also relates to a process instrumentation apparatus employing such sensor.

Sensors such as thermocouples and piezoelectric elements are typically used for the process instrumentation for measuring the temperature, pressure and the like in a plant such as manufacturing plant or electric power plant. Most of these sensors are standardized so that they output a current ranging from 4 to 20 mA, and each output is conducted over an electric cable to its corresponding signal processing unit in a sensor-by-sensor basis.

Since the sensor output is given to the signal processing unit on a sensor-by-sensor basis, the more the sensors the greater the number of the cables in use. Running and maintaining the cables are accordingly difficult, and the effect of noise on signal-carrying cables is increasingly problematic. Optical fibers offer a fast data rate in signal transmission and an excellent noise immunity, and the use of optical fibers as an information transmission medium has now begun in plants.

SUMMARY OF THE INVENTION

A primary object of the present invention is to substantially eliminate defects or drawbacks encountered in the prior art and to provide an optical-modulation-type sensor suitable for a multiplex transfer system using an optical fiber means and a process instrumentation apparatus provided with the optical-modulation-type sensor capable of making reduce connection cables in number and improving noise immunity performance.

This and other objects can be achieved according to the present invention by providing, in one aspect, an optical-modulation-type sensor comprising an input condenser lens for collecting light from a light source;

a polarizer for linearly polarizing the light from the input condenser lens;

a light-transmissive piezo-oscillator which is provided with an oscillator circuit and to which the linearly polarized light is introduced from the polarizer;

an analyzer for linearly polarizing the light from the piezo-oscillator; and an output condenser lens for converging the linearly polarized light from the analyzer.

The optical-modulation-type sensor may further comprise a plurality of piezo-oscillators having different oscillation frequencies arranged between the polarizer and the analyzer, and also comprise a wavelength plate arranged between the polarizer and the piezo-oscillators for circularly polarizing the linearly polarized light from the polarizer.

In another aspect, there is provided an optical-modulation-type sensor comprising:

an input condenser lens for collecting light from a light source;

a polarizer for linearly polarizing the light from the input condenser lens;

a light-transmissive piezo-oscillator which is provided with an oscillator circuit, the piezo-oscillator having a transmissive surface on one side thereof and a reflective surface on another side thereof;

an analyzer for linearly polarizing the light from the piezo-oscillator; and an output condenser lens for converging the linearly polarized light from the analyzer.

This optical-modulation-type sensor may further comprise a plurality of light-transmissive piezo-oscillators having different oscillation frequencies arranged on a light input side of the piezo-oscillator and comprise a wavelength plate arranged between the polarizer and the piezo-oscillators for circularly polarizing the linearly polarized light from the polarizer.

The light source is a laser light source for emitting a linearly polarized laser light to the piezo-oscillator through a polarization plane retaining fiber which retains polarization plane.

According to the present invention, there is further provided a process instrumentation apparatus comprising:

an optical-modulation-type sensor of the structure defined above;

an optical fiber for transmitting the light from the light source to the optical-modulation-type sensor;

a photoelectric converter operatively connected to an output side of the optical-modulation-type sensor for converting to an electrical signal the transmitted light which is intensity modulated with the oscillation frequency of the piezo-oscillator; and a signal processing unit for acquiring a process quantity based on the frequency of an output signal from the photoelectric converter.

This process instrumentation apparatus may further comprise a plurality of tee couplers provided for the optical fiber and wherein a plurality of the optical-modulation-type sensors are arranged in parallel to each other and operatively connected to the tee couplers such that outputs from the optical-modulation-type sensors are superimposed. A plurality of the optical-modulation-type sensors having different oscillation frequencies are connected in series.

In another aspect, there is provided a process instrumentation apparatus comprising:

an optical-modulation-type sensor of the structure defined above;

an optical fiber for transmitting the light from the light source to the optical-modulation-type sensor;

a photoelectric converter operatively connected to an output side of the optical-modulation-type sensor for converting the transmitted optical signal to an electrical signal; and a data conversion circuit operatively connected to the photoelectric converter for converting an electric signal outputted from the photoelectric converter to process quantity in response to a conversion amendment data for converting process quantity from frequency of the electric signal from the converter.

In a still further aspect, there is provided a process instrumentation apparatus comprising:

a plurality to optical-modulation-type sensors each of the structure defined above;

an optical fiber for multiplexing and transmitting the output optical signals from the respective sensors;

a photoelectric converter operatively connected to output sides of the optical-modulation-type sensor through the optical fiber for converting the transmitted optical signals to electrical signals having frequencies different from each other;

a frequency separation circuit operatively connected to the photoelectric converter for separating process quantities in accordance with the difference of the frequencies; and a data conversion circuit operatively connected to the photoelectric converter for converting an electric signal outputted from the photoelectric converter to process quantities in response to a conversion amendment data for converting process quantities from the frequencies.

In a still further aspect, there is provided a process instrumentation apparatus comprising:

a light source from which a light is emitted;

a light-feed optical fiber connected to the light source;

an optical-modulation-type sensor of the structure defined above;

a light-receive optical fiber for transmitting an optical signal from the optical-modulation-type sensor;

a photoelectric converter operatively connected to an output side of the optical-modulation-type sensor for converting the transmitted optical signal through the light-receive optical fiber to an electrical signal; and a data conversion circuit operatively connected to the photoelectric converter for converting an electric signal outputted from the photoelectric converter to process quantity in response to a conversion amendment data for converting process quantity from frequency of the electric signal from the converter.

In a still further aspect, there is provided a process instrumentation apparatus comprising:

a light source from which a light is emitted;

a light-feed optical fiber connected to the light source;

a plurality of optical-modulation-type sensors each of the structure defined above;

a light-receive optical fiber for multiplexing and transmitting the output optical signals from the respective sensors;

a photoelectric converter operatively connected to output sides of the optical-modulation-type sensors through the light-receive optical fiber for converting the transmitted optical signals to electrical signals having frequencies different from each other;

a frequency separation circuit operatively connected to the photoelectric converter for separating process quantities in accordance with the difference of the frequencies; and a data conversion circuit operatively connected to the photoelectric converter for converting electric signals outputted from the photoelectric converter to process quantities in response to a conversion amendment data for converting process quantities from the frequencies.

In such aspect, the optical-modulation-type sensors are connected in parallel to each other through the light-feed optical fiber and said light-receive optical fiber, or the optical-modulation-type sensors are arranged in parallel to each other at both ends thereof through the light-feed optical fibers to which an optical waveguide coupler is provided.

In a still further aspect, there is provided a process instrumentation apparatus comprising:

an external light source;

an optical fiber for transmitting a light from the light source;

a plurality of reflection-optical-modulation-type sensors each in which the light is inputted through the optical fiber and is then intensity modulated to natural ranges in accordance with process quantities and optical signals are reflected and generated from the sensors;

a photoelectric converter operatively connected to output sides of the reflection-optical-modulation-type sensors for converting the transmitted optical signals to electrical signals having frequencies different from each other; and an optical branching circuit provided for the optical fiber and adapted to branch the optical signals from the reflection-optical-modulation-type sensors and guide them to the photoelectric converter.

In this aspect, the reflection-optical-modulation-type sensors are arranged in parallel to each other at both ends thereof through the optical fibers to which an optical waveguide coupler is provided.

The process quantities may be transferred through the output circuit connected to the data conversion circuit.

According to the optical-modulation-type sensor of the structure described above, the light from the light source is changed to a parallel light through the input condenser lens and linearly polarized by the polarizer. When a voltage is supplied, the piezo-oscillator oscillates and generates, as an output light, elliptically polarized light due to strain and electric field. The analyzer picks up the elliptically polarized light as a linearly polarized light, performing optical intensity modulation in response to the oscillation frequency of the piezo-oscillator. The light may be circularly polarized by the wavelength plate before entering the piezo-oscillator.

A plurality of piezo-oscillators having different oscillation frequencies are arranged between the polarizer (or wavelength plate) and the analyzer. Thus, different process quantities, such as temperature and pressure, are concurrently measured.

The light-transmissive piezo-oscillator having an oscillator circuit is provided with a transmissive surface on one side and a reflective surface on the other side thereof. Thus, an incident light is admitted through the transmissive surface, reflected off the reflective surface on the other side and let out through the transmissive surface. As a result, light travels through the piezo-oscillator twice the distance over which light simply passes through. Thus, light is intensity modulated twice, and measurement of a frequency component in signal processing is easier.

A plurality of light-transmissive piezo-oscillators having different oscillation frequencies are arranged on the light input side of the piezo-oscillator. This arrangement results in a composite sensor capable of measuring a plurality of process quantities.

In the optical-modulation-type sensor, the light source is a laser light source for emitting a linearly polarized laser light, and the polarization plane retaining fiber which retains polarization plane transmits the laser light to the piezo-oscillator. In this arrangement, the linearly polarized light that would be otherwise given by the polarizer is directly guided from the laser light source, and thus the polarizer is eliminated.

According to the process instrumentation apparatus of the structure described above, the light from the light source is transmitted through the optical fiber to the optical-modulation-type sensor of the structure described above. The photoelectric converter converts to an electrical signal the transmission light which is intensity modulated with the oscillation frequency of the piezo-oscillator of the sensor, and the signal processing unit acquires a process quantity such as a temperature or pressure based on the frequency of the output signal from the photoelectric converter. The number of the cables, each running between a sensor and its corresponding signal processing unit on a sensor-by-sensor basis, is reduced and an improved noise immunity results.

The process instrumentation apparatus, in another aspect, may comprise a tee coupler which causes the optical fiber to branch off and a plurality of optical-modulation-type sensors having different oscillation frequencies. The sensors are connected in parallel, and the outputs from the plurality of optical-modulation-type sensors are superimposed. Thus, a multi-frequency, multi-point measurement system can be realized.

In the process instrumentation apparatus is provided with a plurality of optical-modulation-type sensors having different oscillation frequencies, and these sensors are connected in series. In this arrangement, the tee coupler can be eliminated and the length of the optical fibers is shortened.

According to the process instrumentation apparatus of the other structures described above, there are provided the following functions and effects.

In one aspect, the sensor serves to convert the process quantities to the frequency signals having natural ranges, which are then outputted as optical signals, and the optical signals are transmitted through the optical fiber to the photoelectric conversion circuit to convert them to electric signals. In the data conversion circuit, the electric signals are processed in response to the conversion correction data for converting the process quantities from the frequencies of the electric signals, thereby obtaining the process quantities.

In another aspect, a plurality of the sensors are arranged, and the optical signals from these sensors are multiplexed and transmitted to the photoelectric conversion circuit through the optical fiber. The multiplexed electric signals from the photoelectric conversion circuit are separated in accordance with the difference of the frequencies through the frequency separation circuit. The electric signals thus obtained are then processed in the manner as mentioned above to thereby obtain the process quantities.

In a further aspect, the light from the external light source is transmitted to the sensor through the light-feed optical fiber, and in the sensor, the light is intensity modulated in accordance with the process quantities and then transmitted to the photoelectric conversion circuit through the light-receive optical fiber. The electric signals thus obtained are then processed in the manner as mentioned above to thereby obtain the process quantities.

In a still further aspect, a plurality of sensors are arranged, and the optical signals from these sensors are multiplexed and transmitted to the photoelectric conversion circuit through the light-receive optical fiber. The multiplexed electric signals from the photoelectric conversion circuit are separated in accordance with the difference of the frequencies through the frequency separation circuit. The electric signals thus separated are processed in the data conversion circuit in response to the conversion correction date to thereby obtain the process quantities.

In the above aspect, the a plurality of sensors may be arranged in parallel to each other in a manner branched from the light-feed and light-receive optical fibers.

In an arrangement in which the sensors are arranged in parallel to each other at both the ends thereof through the optical waveguide coupler provided for the light-feed and light-receive optical fibers. This arrangement is suitable for the centralized arrangement of the sensors.

In an arrangement of the reflection-optical-modulation-type sensor, the light from the external source is inputted into the sensor through the optical fiber and is intensity modulated in accordance with the process quantities. The thus modulated optical signal is reflected in the sensor and transmitted again through the optical fiber. The reflected light is guided to the photoelectric conversion circuit without returning to the light source through the optical branching circuit. Thereafter, the electric signals thus obtained are then processed in the manner as mentioned above to thereby obtain the process quantities. According to this arrangement, only the single optical fiber is required for the light feeding and receiving, thus being advantageous.

The reflection-type sensor is connected to the optical fiber through the optical waveguide coupler, and the signal from each sensor is transmitted to the data conversion circuit through the optical waveguide coupler.

The process quantities detected by the sensor is outputted through the output circuit connected to the data conversion circuit.

The further nature and characteristic features of the present invention will be made more clear from the following descriptions made with reference to the accompanying drawings.

DESCRIPTION OF THE PREFERRED EMBODIMENTS

Figure 1:
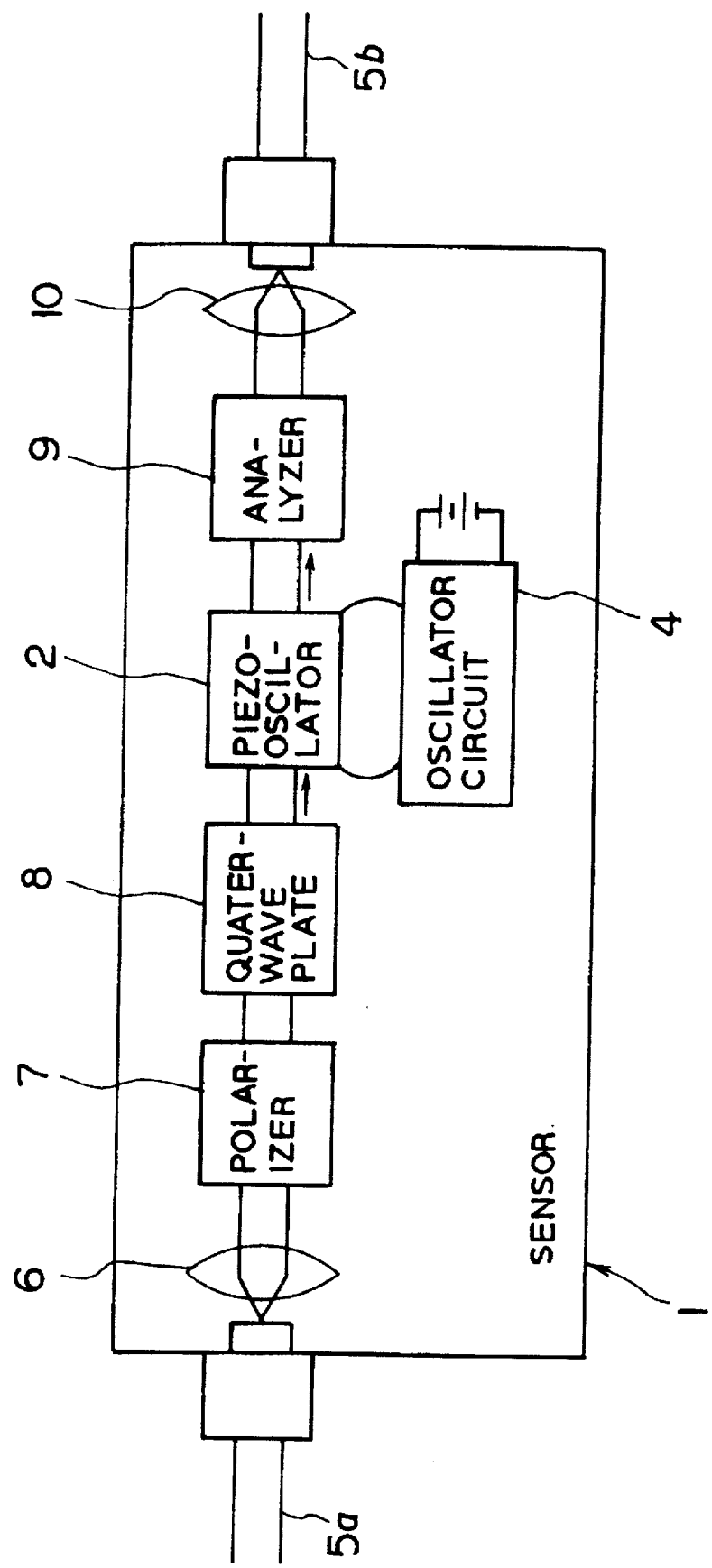
FIG. 1 is a block diagram showing a first embodiment of the optical-modulation-type sensor of the present invention.

Referring now to the drawings, the preferred embodiments of the present invention will be described hereunder.

FIG. 1 is the block diagram showing the first embodiment of the optical-modulation-type sensor according to the present invention. As shown in FIG. 1, an optical-modulation-type sensor 1 comprises a piezo-oscillator 2, which is typically constructed of a quartz crystal or lithium niobate (LiNbO$_3$). Its natural oscillation frequency is known to vary with temperature and pressure, and thus temperature or pressure is measured by measuring its natural oscillation frequency. The piezo-oscillator 2 offers a high accuracy and an excellent repeatability, as well. The quartz crystal is a photo-elastic element, and is capable of phase or intensity modulating of the transmitted light therethrough, based on the photo-elastic effect in which the refractive index of the crystal varies with stress-strain taking place under pressure. Lithium niobate presents, in addition to the photo-elastic effect, the Pockels effect in which the refractive index varies with an applied electric field, and is equally capable of phase or intensity modulation of the transmitted light therethrough.

The surface of the piezo-oscillator 2 is optically polished and then a transparent electrode is deposited on the polished surface of the piezo-oscillator 2 so that light passes therethrough. An oscillator circuit 4 driven by a battery 3 is mounted on the piezo-oscillator 2.

Disposed on the light input side of the piezo-oscillator 2 are an input condenser lens 6 for collecting light to change it to a parallel light, a polarizer 7 for linearly polarizing the parallel light from the lens 6, and a quarter-wave plate 8 for circularly polarizing the linearly polarized light from the polarizer 7, in the described order toward the piezo-oscillator 2. Disposed on the light output side of the piezo-oscillator 2 are an analyzer 9 for linearly polarizing the light from the piezo-oscillator 2 and an output condenser lens 10 for converging the linearly polarized light from the analyzer 9, in the described order from the piezo-oscillator 2. The light converged by the lens 10 is conducted to a signal processing unit, not shown, via an optical fiber 5b.

The operation of this embodiment will be as follows.

The light delivered through an optical fiber 5a is changed to a parallel light by the lens 6, linearly polarized by the polarizer 7, and circularly polarized by the quarter-wave plate 8 before entering the piezo-oscillator 2. When supplied with a voltage, the piezo-oscillator 2 oscillates and outputs the elliptically polarized light due to strain and electric field. The analyzer 9 picks up the elliptically polarized light as a linearly polarized light, and thus optical intensity modulation responsive to the oscillation frequency of the piezo-oscillator 2 is performed. The resulting light is converged by the lens 10 and then transmitted to the signal processing unit via the optical fiber 5b.

Figure 2:
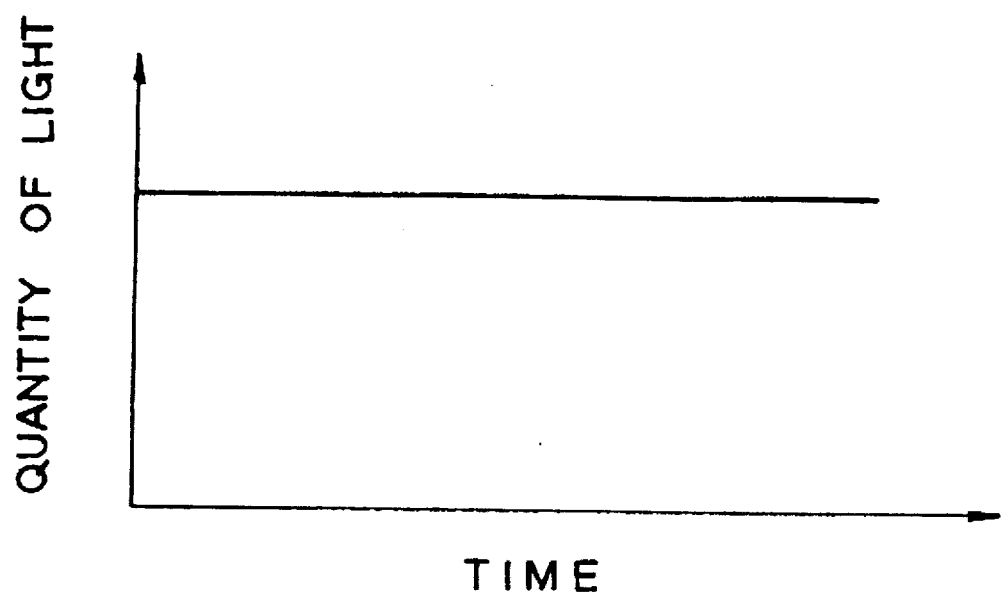
FIG. 2 shows an intensity change of incident light over time to the optical-modulation-type sensor of the first embodiment.
Figure 3:
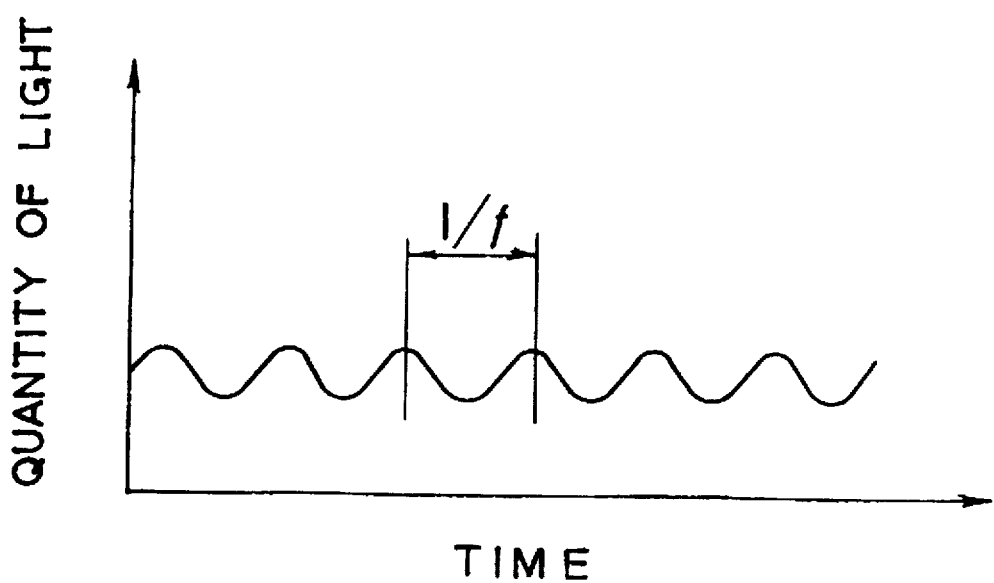
FIG. 3 shows the intensity change of output light over time from the optical-modulation-type sensor.

FIG. 2 shows the intensity change of incident light over time to the optical-modulation-type sensor 1. FIG. 3 shows the intensity change of output light over time from the optical-modulation-type sensor 1. As shown in FIGS. 2 and 3, when supplied with the input light of a constant intensity, the piezo-oscillator 2 gives the output light that is intensity modulated by the oscillation frequency f. The change of quantity to be measured, namely change of temperature or pressure, changes the oscillation frequency f accordingly. The signal processing unit senses the oscillation frequency f from the output light, and converts it into a temperature or pressure value. The optical-modulation-type sensor 1 is provided with a mechanism which transmits the change of quantity to be measured, such as temperature or pressure, to the piezo-oscillator 2, in an efficient manner suited to the quantity to be measured.

In this embodiment, the optical-modulation-type sensor 1 allows the light transmitted through the optical fibers to be directly intensity modulated.

In the above embodiment, when a plurality of piezo-oscillators 2 having different oscillation frequencies covering an entire operation range are mounted between the quarter-wave plate 8 and the analyzer 9, different process quantities such as temperature and pressure are simultaneously measured. Furthermore in this arrangement, frequency differences between the plurality of piezo-oscillators 2 may be used as correction means in linearity. In this case, when the light is modulated by the piezo-oscillators 2 having different oscillation frequencies, a plurality of frequency components are transmitted in a superimposed manner. These frequency components may be separated in the signal processing unit, and thus a multi-frequency composite sensor can be realized.

Figure 4:
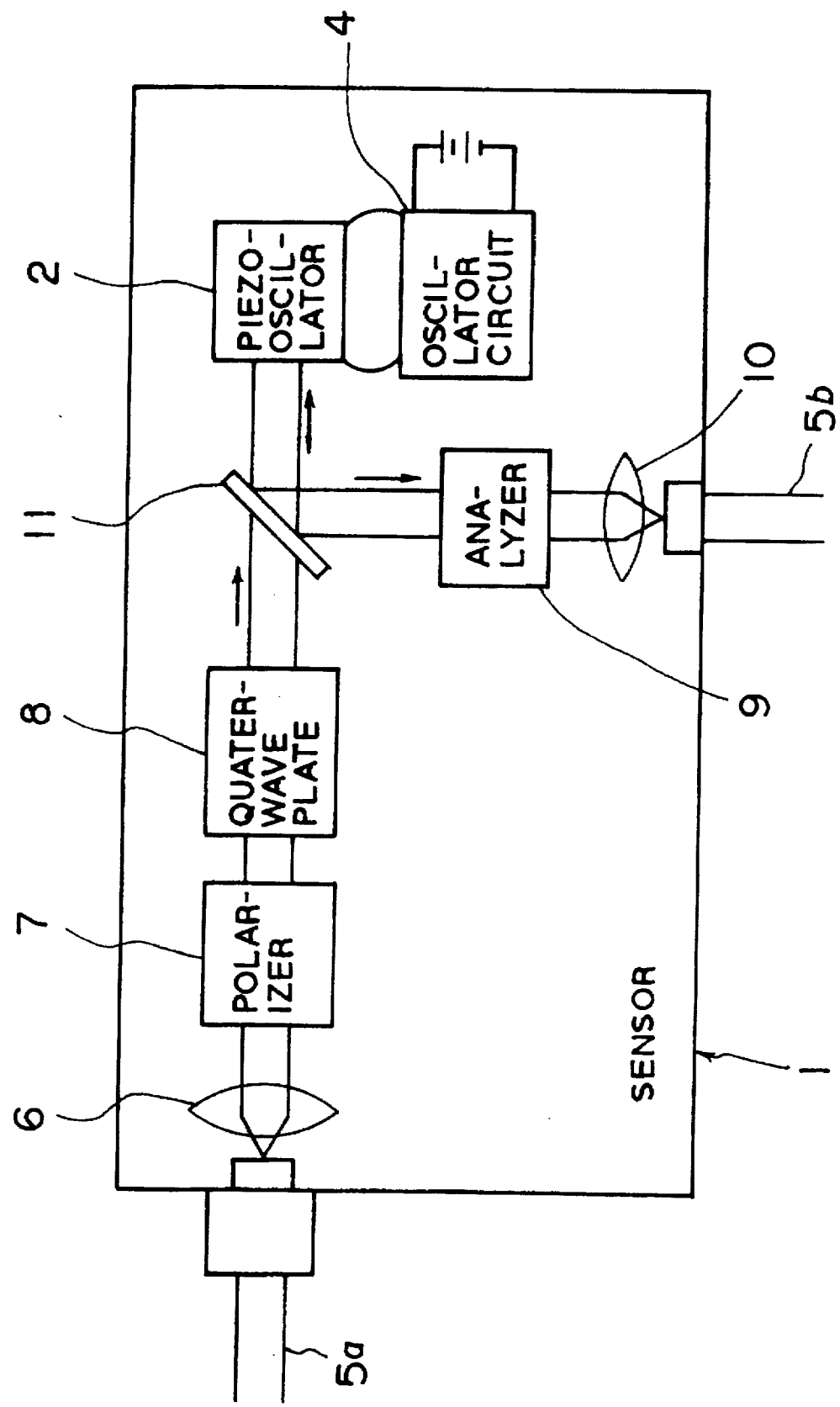
FIG. 4 is a block diagram showing a second embodiment of the optical-modulation-type sensor of the present invention.

FIG. 4 is the block diagram showing the second embodiment of the optical-modulation-type sensor of the present invention. In FIG. 4, the components which are equivalent to those described with reference to the first embodiment of FIG. 1 are designated with the same reference numerals. As shown in FIG. 4, the piezo-oscillator 2 in the optical-modulation-type sensor 1a in this embodiment is optically polished. A transparent electrode is deposited on one surface of the piezo-oscillator 2 to form a light-transmissive surface, and silver is deposited on the other surface of the piezo-oscillator 2 to form a reflective surface. A half mirror 11 is disposed between the piezo-oscillator 2 and the quarter-wave plate 8.

In the above arrangement, the light that has passed through the lens 6, the polarizer 7, the quarter-wave plate 8 and the half mirror 11 and is reflected by the piezo-oscillator 2. The reflected light is reflected by the half mirror 11 at right angles with respect to the incident light and then directed to the analyzer 9.

According to this embodiment, the transparent electrode is deposited onto the one surface of the piezo-oscillator 2 to form the transmissive surface, and silver is deposited onto the other surface of the piezo-oscillator 2. The incident light is admitted through the transmissive surface and reflected from the reflective surface on the opposite side. Thus, the light is outputted after it travels back and forth once in the piezo-oscillator 2. As a result, the light travels through the piezo-oscillator 2 twice the distance over which the light simply passes, and therefore, the effect of intensity modulation is doubled. This arrangement facilitates the detection of frequency components in signal processing.

In this embodiment, the angle of reflection may be set to be different from the angle of incidence by making the angle of incidence oblique to the reflective surface. Furthermore, in this embodiment, a plurality of piezo-oscillators, having different oscillation frequencies with both surfaces of each oscillator being transparent, are disposed between the piezo-oscillator 2 and the half mirror 11, namely, to the light input side of the piezo-oscillator 2. This arrangement provides a composite sensor which can detect a plurality of process quantities. All transmitted light is allowed to travel the piezo-oscillator 2 back and forth once, and the effect of intensity modulation is doubled.

Further, it is possible, as light feeding means, to project the reflected light again to the optical fiber 5a using for the light feeding without utilizing the half mirror 11.

In the first and second embodiments, as a light source, a laser light source that directly emits a linearly polarized laser light may be used, and a polarization plane retaining fiber that retains polarization plane may be used to guide the laser light directly to the piezo-oscillator 2. Thus, the polarizer 7 may be eliminated.

Furthermore, in the first and second embodiments, part of the input light from the optical fiber 5a may be directed onto a photoelectric conversion element such as a solar cell, and the photoelectric conversion element may feed power to the oscillator circuit 4. The battery 3 is thus dispensed with. The power consumption is lowered by constructing the oscillator circuit 4 of a CMOS (complementary metal oxide semiconductor) device.

As described above, the optical-modulation-type sensor of the first embodiment comprises an input condenser lens for collecting light from a light source, a polarizer for linearly polarizing the light from the input condenser lens, a wavelength plate for circularly polarizing the linearly polarized light from the polarizer, a light-transmissive piezo-oscillator which has an oscillator circuit and to which the circularly polarized light is introduced from the wavelength plate, an analyzer for linearly polarizing the light from the piezo-oscillator, and an output condenser lens for converging the linearly polarized light from the analyzer. Thus, the light transmitted through optical fibers is directly intensity modulated.

The optical-modulation-type sensor comprises a plurality of piezo-oscillators having different oscillation frequencies arranged between the wavelength plate and the analyzer. Thus, different process quantities, such as temperature and pressure, are concurrently measured.

According to the optical-modulation-type sensor of the second embodiment, the light-transmissive piezo-oscillator having an oscillator circuit is provided with a transmissive surface on one side and a reflective surface on the other side thereof. Thus, an incident light is admitted through the transmissive surface, reflected off the reflective surface on the other side and let out through the transmissive surface. As a result, the light travels through the piezo-oscillator twice the distance over which light simply passes through. Thus, light is intensity modulated twice, and measurement of a frequency component in signal processing is easier. According to the optical-modulation-type sensor of this embodiment, a plurality of light-transmissive piezo-oscillators having different oscillation frequencies are arranged on the light input side of the piezo-oscillator. This arrangement results in a composite sensor capable of measuring a plurality of process quantities.

According to the optical-modulation-type sensor of the characters described above, the light source is a laser light source for emitting a linearly polarized laser light, and the polarization plane retaining fiber which retains polarization plane transmits the laser light to the piezo-oscillator. In this arrangement, the linearly polarized light that would be otherwise given by the polarizer is directly guided from the laser light source, and thus the polarizer is dispensed with.

Figure 5:
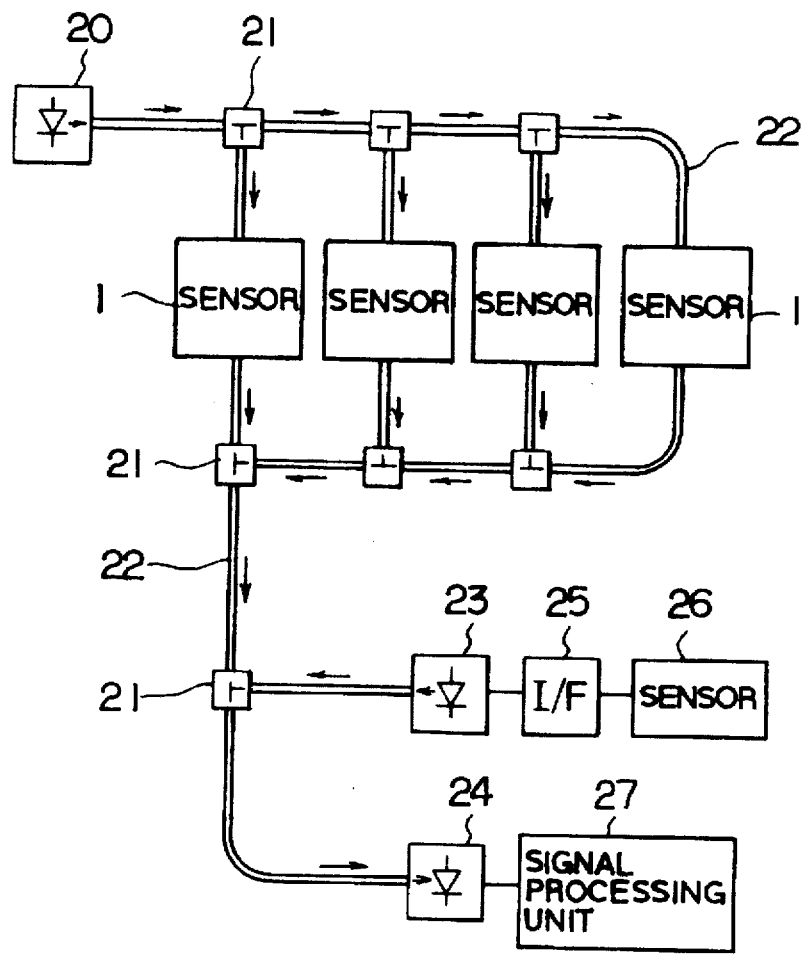
FIG. 5 is a block diagram showing a first embodiment of the process instrumentation apparatus of the present invention.

FIG. 5 is the block diagram showing a first embodiment of the process instrumentation apparatus according to another aspect of the present invention. The optical-modulation-type sensor 1 is designed as illustrated in FIG. 1G. 1, and employs a quartz crystal oscillator for temperature or pressure measurement. A light emitting diode 20 is used as a light source that provides a light of a constant intensity. The light emitting diode 20 is connected to a plurality of tee couplers 21 such as optical fiber coupler that are connected in series. A plurality of optical-modulation-type sensors 1 are connected in a parallel connection (ladder network) in a manner that one end of each sensor 1 connected through a multi-mode optical fiber 22 to the corresponding tee coupler 21.

The other end of each of the plurality of sensors 1 is connected through a multi-mode optical fiber 22 to its respective optical fiber coupler 21. Thus, the lights from the plurality of sensors 1 are superimposed at each of the tee couplers 21. The multi-mode optical fiber 22 joins at another coupler 21 where there meet one optical fiber from a light emitting diode 23 and the other optical fiber from a photoelectric conversion element 24 as a photoelectric converter. The photoelectric conversion element 24 converts into an electrical signal the transmitted light which is intensity modulated with the oscillation frequency of the piezo-oscillator of the sensors 1. The light emitting diode 23 connects to a current-frequency converter 25 and a prior art type process sensor 26. The photoelectric conversion element 24 connects to a signal processing unit 27.

The operation of this embodiment is described hereunder.

The light given by the light emitting diode 20 branches to the tee couplers 21 and reaches the sensors 1 through their respective multi-mode optical fibers 22. The sensors employ the respective quartz crystals having different oscillation frequencies with no frequency ranges overlapped one another. Each of the sensors 1 performs intensity modulation within the frequency range suitable for each process quantity or variable such as temperature and pressure. The incident light of a constant intensity is changed to a pulsating current responsive to the oscillation frequency of the quartz crystal.

The output lights from the plurality of sensors 1 are superimposed through the tee couplers 21, and then guided to the photoelectric conversion element 24 via the multi-mode optical fiber 22. This output light transmission multi-mode optical fiber 22 also receives the output of the light emitting diode 23 that is driven by the output frequency signal of the current-frequency converter 25, wherein the current-frequency converter 25 converts the current output of the process sensor 26 into the frequency signal.

The output signal of the photoelectric conversion element 24 is separated and demodulated on a frequency by frequency basis by the signal processing unit 27. Referring to the predetermined relationship between frequency and process quantity, temperature or pressure is calculated. Since the oscillator circuit 4 of the sensor 1 is operated by the battery 3, no power cable is required and the sensor is completely electrically isolated from any external system.

According to this embodiment, the cable running between the sensor and its signal processing unit in the prior art is replaced with two optical fibers, one input means and the other output means and thus, the number of cables is reduced and noise immunity is improved. Since the outputs of the plurality of optical-modulation-type sensors 1 are superimposed, a multi-frequency, multi-point measurement system can be realized.

Figure 6:
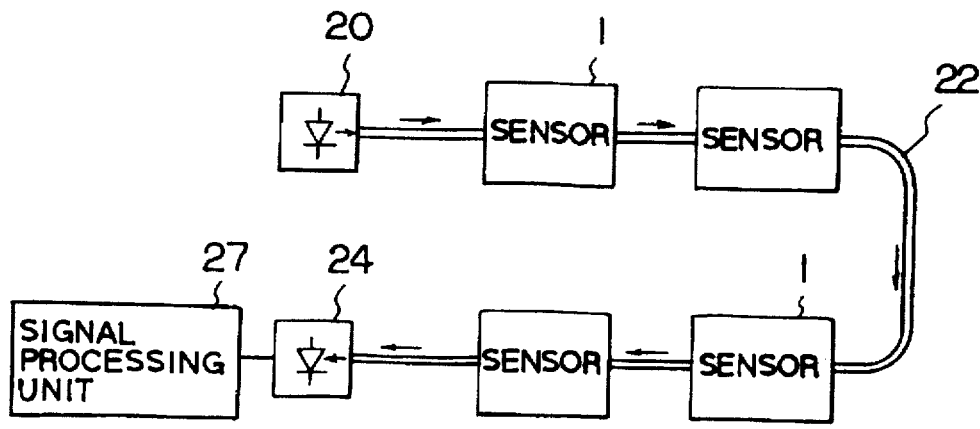
FIG. 6 is a block diagram showing a second embodiment of the process instrumentation apparatus of the present invention.

FIG. 6 is the block diagram showing a second embodiment of the process instrumentation apparatus according to the present invention. In FIG. 6, those components that are equivalent to those described with reference to the first embodiment of the process instrumentation apparatus are designated with the same reference numerals. The process instrumentation apparatus of this embodiment is constructed of four optical-modulation-type sensors 1 having different oscillation frequencies which are connected in a series connection via input and output multi-mode optical fibers therebetween as shown in FIG. 6, without using the tee couplers. The photoelectric conversion element 24 as the photoelectric converter is connected to the last stage sensor 1 through a multi-mode optical fiber 22. The signal processing unit 27 is connected to the photoelectric conversion element 24.

Although the output light from the sensor 1 is linearly polarized, its polarization plane is randomized in the course of transmission through a multi-mode optical fiber 22 and then introduced to a subsequent stage sensor 1. Since in this embodiment, a plurality of sensors 1 are connected in series through the multi-mode optical fibers 22, no tee couplers are required. A shorter overall length of the multi-mode optical fibers 22 can be realized, compared with the first embodiment of the process instrumentation apparatus. The rest of the construction of this embodiment and its advantages remain unchanged from those of the first embodiment and its explanation will not be repeated herein.

In this embodiment, the sensor 1 may include a laser light source that emits a linearly polarized laser and a polarization plane retaining fiber that retains polarization plane may be used. In this arrangement, the polarization retaining fiber transmits the already linearly polarized light as an input light to the subsequent stage sensor 1, and thus, all analyzers may be removed from all sensors 1.

According to the first and second embodiments of the process instrumentation apparatus, the current output from an existing process sensor ranging from 4 to 20 mA may be converted into a frequency signal, which is used to drive a light emitting diode. The output light of the light emitting diode may be superimposed on a transmission optical fiber. Alternatively, an optical modulation element such as a Pockels element may be used to perform intensity modulation onto a light transmitted through an optical fiber. Thus, the present invention is not limited to the sensor employing the piezo-oscillator. The present invention may be combined with existing process sensors in order to construct a process instrumentation system including a diversity of sensors for different purposes.

According to the process instrumentation apparatus of the present invention in one aspect, the light from the light source is transmitted through the optical fiber to the optical-modulation-type sensor of the structures described above. The photoelectric converter converts to an electrical signal the transmission light that is intensity modulated with the oscillation frequency of the piezo-oscillator of the sensor, and the signal processing unit acquires a process quantity such as a temperature or pressure based on the frequency of the output signal from the photoelectric converter. The number of the cables, each running between a sensor and its respective signal processing unit on a sensor-by-sensor basis, is reduced and an improved noise immunity results. A high reliability can thus be realized.

The process instrumentation apparatus comprises an optical fiber coupler that causes the optical fiber to branch off, and a plurality of optical-modulation-type sensors having different oscillation frequencies. The sensors are connected in parallel and the outputs from the plurality of optical-modulation-type sensors are superimposed. Thus, a multi-frequency, multi-point measurement system can be realized.

The process instrumentation apparatus comprises a plurality of optical-modulation-type sensors having different oscillation frequencies, and these sensors are connected in series. In this arrangement, the tee coupler is dispensed with and the length of the optical fiber is shortened.

The process instrumentation apparatus of the present invention is further represented by the following embodiments, which will be described hereunder with reference to FIGS. 7–14. Further, it is to be noted that, in the following embodiments, optical-modulation-type sensors each of the character substantially the same as that of the former embodiments of FIGS. 1 to 4 is utilized by adding reference numeral 31 in substitution for the reference numeral 1.

First, a process instrumentation apparatus of a further (third) embodiment using the optical-modulation-type sensor described above will be described hereunder with reference to FIGS. 7 and 8.

In this embodiment, an optical-modulation-type sensors 31 are of substantially the same character as that 1 of the former embodiment, and accordingly, the details thereof are omitted herein.

Figure 7:
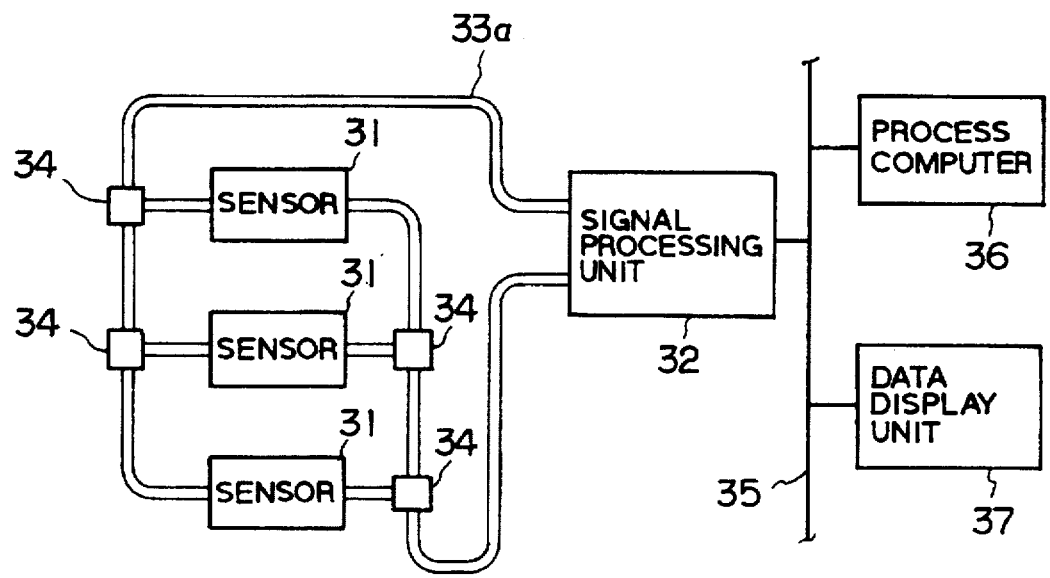
FIG. 7 is a block diagram showing a third embodiment of the process instrumentation apparatus of the present invention.
Figure 8:
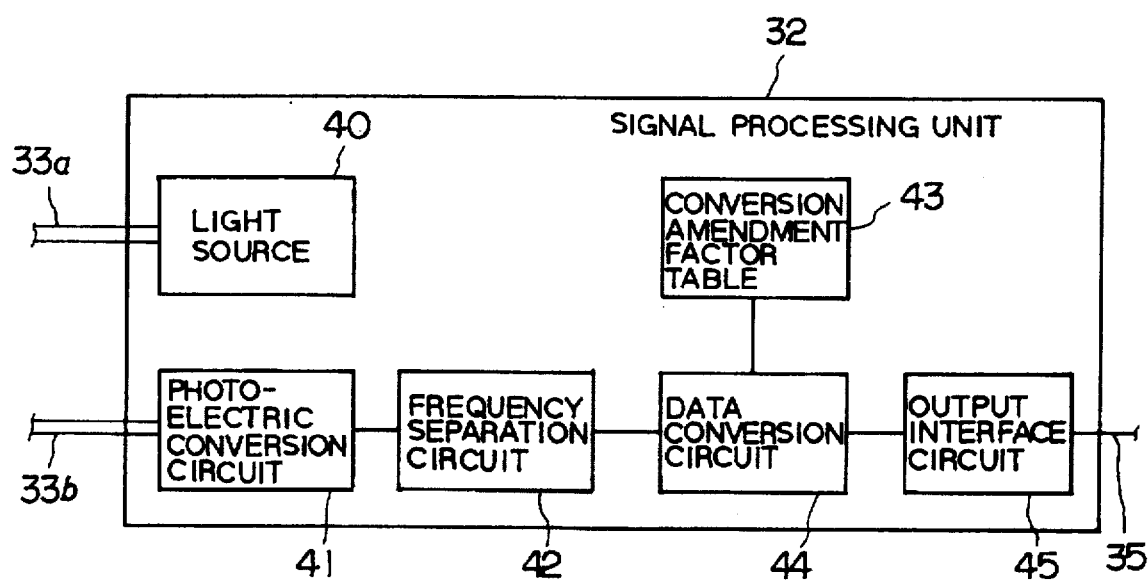
FIG. 8 is a block diagram showing structure of a process instrumentation apparatus of FIG. 7.

Referring to FIGS. 7 and 8, light from a light source 40 incorporated in a signal processing unit 32, which is of a type similar to that 2 of the former embodiment, is divided by a light-feed optical fiber 33a and tee couplers 34 such as optical directional coupler, and supplied to optical-modulation-type sensors 31, which are merely called sensors 31 hereinafter. The sensor 31 serves to modulate the light in its intensity with a frequency in accordance with a process quantity or variable and multiplexed through the tee coupler 34 and a light-receive optical fiber 33b, and the light is thereafter delivered to the signal processing unit 32, which is operatively connected to a process computer or calculator 36 and a data display unit 37 through a computer network 5.

In the process instrumentation apparatus of the structure described above, the light fed through the light-feed optical fiber 33a is branched through the tee couplers 34 and fed to the sensors 31 respectively with all equal light quantity. For this reason, the respective tee couplers 34 have different branching ratios.

The respective sensors 31 are set so as to preliminarily perform frequency-conversion with different frequencies and serve to convert the process quantity to frequency, and accordingly, even if mixed output signals are transmitted, they can be electrically separated thereafter in accordance with the difference of the frequencies.

Optical output signals from the respective sensors 31 are combined by the tee couplers 34 and fed to the signal processing unit 32 through the light-receive optical fiber 33b. Thus, since the output signals from the plurality of sensors 31 are multiplexed and transferred to the signal processing unit 32 through the optical fiber 33b, the connection cables can be thus reduced in numbers, thereby improving noise immunity performance.

FIG. 8 is a block diagram showing an inner arrangement of the signal processing unit 32 utilized in this embodiment of FIG. 7. The light delivered into the signal processing unit 32 is electrically converted into an electric signal through a photoelectric conversion circuit 41, and the output signal from the photoelectric conversion circuit 41 is then separated to the respective sensors 31 through a frequency separation circuit 42. In a data conversion circuit 44 connected to the frequency separation circuit 42, the process quantities are calculated by means of these frequencies by using data for the respective sensors preliminarily stored in a memory means of a conversion factor table 43 for amendment or correction.

At this operation, the amendments of, for example, the non-linearlity of the output value and the temperature variation are performed. Through the total memorizing of the conversion amendment factors of the respective sensors 31 in the signal processing unit 32, the respective sensors 31 are free from the calculation for amendment and free from the provision of any electronic circuit for such calculation, thus the sensors being made simple in their structures with high reliability.

The respective calculated process quantities are outputted to the computer network 35 as true values to an output interface circuit 45. The process computer 36, the data display unit 37 and other process instrumentation apparaus are operatively connected to the computer network 35 so that the process computer 36 and the data display unit 37 can obtain desired process quantities at any time from an optional process instrumentation apparatus. The connection of the respective process instrumentation apparatus through the network makes possible to reduce the number of the connection cables and to use commonly the process informatins in a plant.

According to this embodiment, as mentioned above, the process instrumentation apparatus improved in the noise immunity performance with reduced cables in comparison with the conventional structure can be realized through the connection of the optical fibers by utilizing the optical-modulation-type sensors.

Further, in the present embodiment, since the optical-modulation-type sensors are utilized as sensors 31, the light source 40 is required to incorporate in the signal processing unit 32, but in a case where the sensor 31 is itself provided with a light source, such light source 40 can be eliminated and, hence, the light-feed optical fiber 33a can be also eliminated. Thus, the process quantities can be measured by a further simple arrangement.

Furthermore, particularly, in the present embodiment, although the respective sensors 31 are arranged in palallel with each other through the light-feed optical fiber 33a and the light-receive optical fiber 33b, the sensors 31 may be arranged in series. The arrangement of a signal sensor 31 may be also adapted, and in such case, the light-feed and light-receive optical fibers 33a and 33b are connected to the single sensor 31.

Still furthermore, in the present embodiment, as described above with reference to FIG. 8, the signal processing unit 32 is provided with the light source 40, the photoelectric conversion circuit 41, the frequency separation circuit 42, the conversion amendment factor table 43, the data conversion circuit 44 and the output interface circuit 45. In this arrangement, the light source 40 may be disposed inside or outside the signal processing unit 32, and the maintenance and the maneuvability of the unit 32 may be improved by integrally arranging the other circuits in the unit 32.

A further embodiment of the process instrumentation apparatus according to the present invention will be described hereunder with reference to FIG. 9, in which like reference numerals are added to elements or circuits corresponding to those of the embodiment of FIGS. 7 and 8 and the explanation thereof is omitted herein.

Figure 9:
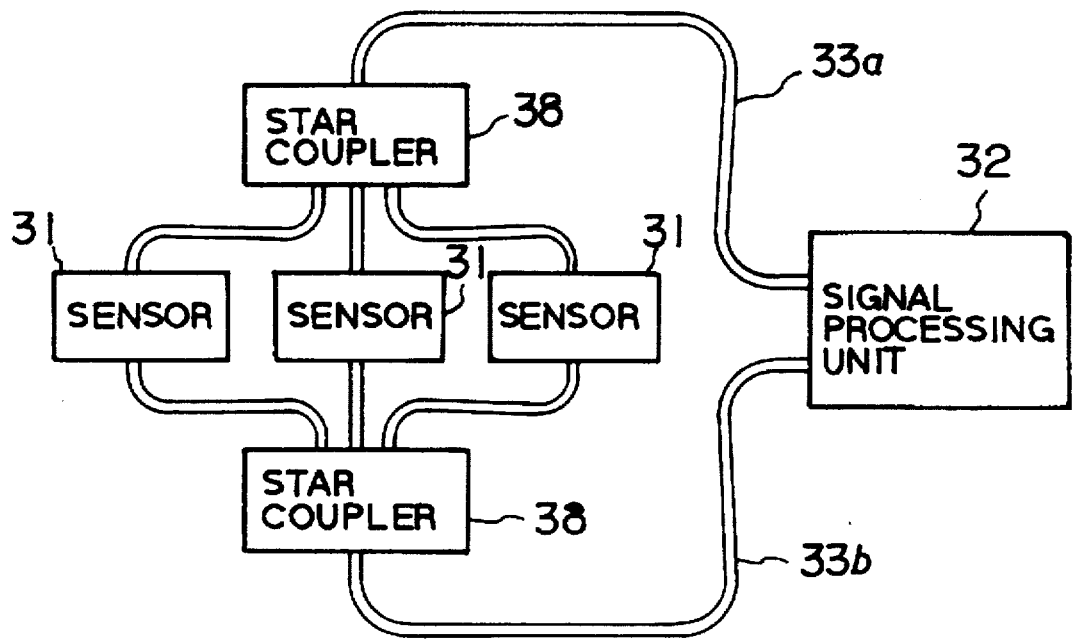
FIG. 9 is a block diagram showing a fourth embodiment of the process instrumentation apparatus of the present invention.

Referring to FIG. 9, the process instrumentation apparatus of this embodiment is provided with a plurality of optical-modulation-type sensors 31 as mentioned in the former embodiment, which serve to convert the process quantities such as temperature and pressure into frequency signals and transmit light supplied from an external means with intensity modulated.

The sensors 31 are centeralized in arrangement to a local board and star couplers 38 are also arranged to the same board. The light fed from the light source 40 incorporated in the signal processing unit 32 is branched and supplied to the respective sensors 31 through the light-feed optical fiber 33a and the star coupler 38. The sensors 31 serve to modulate the light in its intensity with the frequencies corresponding to the process amounts, and the modulated light is multiplexed through the star coupler 38 and the light-receive optical fiber 33b and then transmitted to the signal processing unit 32. The signal processing unit 32 may be connected, though not shown, with a process computer and a data display unit through a computer network such as shown in FIG. 7.

The embodiment of the structure described above will attain the following function.

Each of the star couplers 38 is an optical element for branching one optical fiber into a plurality of ones. The light transmitted through the light-feed optical fiber 33a is branched at once into a necessary number of lights through the star couplers 38, which are then transmitted to the respective sensors 31 with equal light quantity. In a case where the sensors 31 are centralized in their arrangement, even if the light is branched at once by the star coupler 38, it is not necessary to make long the optical fibers for the connection to the respective sensors 31. The respective sensors 31 serve to convert the process quantities to the frequencies different from each other, and the output signals therefrom are combined through the star coupler 38 and then transmitted to the signal processing unit 32 through the light-receive optical fiber 33b.

According to this embodiment, the connection cables can be reduced in number and the noise immunity performance can be improved, and in addition, in the case where the sensors 31 are centeralized in arrangement to the local board or the like, the structure can be made further simple and the manufacturing cost can be reduced by branching the light at once through the star coupler 38 in comparison with the case wherein the sensors are connected in shape of ladder by using the tee coupler 34 such as optical directional coupler having different branching ratios.

Further, the star coupler 38 of the present embodiment is one kind of optical waveguide couplers, which may be classified into directinal couplers and star couplers. The directional coupler is utilized in a case of separating and taking out up-and-down two directional optical signals propagating in the optical fiber, combining and transferring two optical signals to one optical fiber, or branching an optical signal propagating one optical fiber. On the other hand, the star coupler is utilized in a case of branching one optical signal energy into N-ports, combining N-numbers of optical signal energies into one port, or branching N-numbers of optical signal energies respectively into 1/N and uniformly outputting them into N-ports. Accordingly, it may be said that a directional coupler of the type N=2 has substantially the same function as that of the star coupler.

Figure 10:
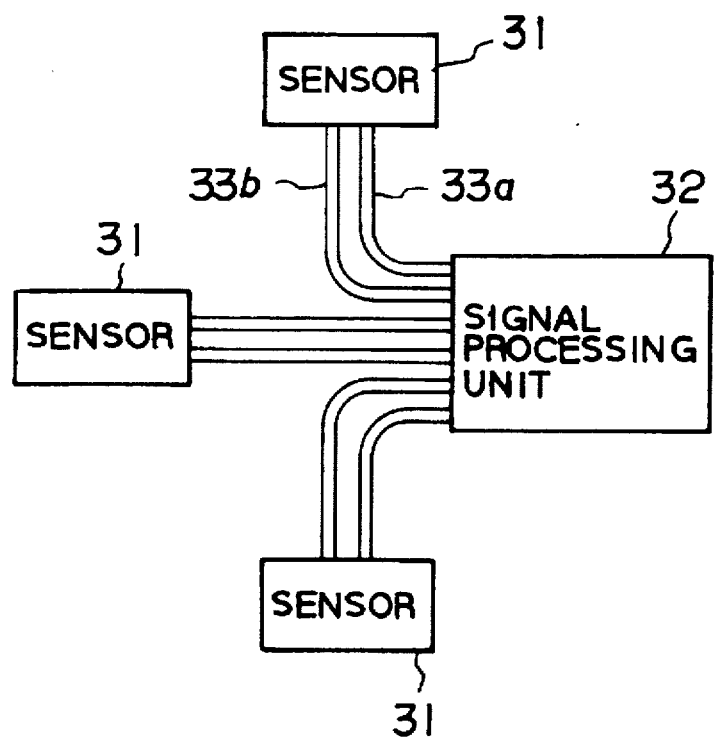
FIG. 10 is a block diagram showing a fifth embodiment of the process instrumentation apparatus of the present invention.

FIG. 10 shows a still further embodiment of the process instrumentation apparatus of the present invention, in which like reference numerals are added to elements or units corresponding to those of the former embodiment of FIG. 7 and the details thereof are omitted herein.

Referring to FIG. 10, the process instrumentation apparatus of this embodiment is provided with a plurality of optical-modulation-type sensors 31 as mentioned in the former embodiment, which serve to convert the process quantities such as temperature and pressure into frequency signals and outputs light supplied from an external means with intensity modulated.

The light fed from the light source 40 incorporated in the signal processing unit 32 is branched therein and uniformly supplied to the respective sensors 31 through the light-feed optical fiber 33a and the star coupler 38. The sensors 31 convert the process quantities into frequencies different from each other and the optical signals outputted therefrom are transmitted again to the signal processing unit 32 through the light-receive optical fiber 33b. In the signal procesing unit 32, these optical output signals are converted individually into electric signals or combined through the tee coupler or star coupler and then converted into the electric signal.

In an arrangement in which the sensors 31 are separated in arrangement in a plant, when a connection system in which the respective sensors 31 are connected in ladder shape or are connected through the star couplers is adapted, there may cause a case where the length of the optical fiber is made long, and in such case, the radial connection system such as of this embodiment will be the most optimum system in view of cost involved.

According to this embodiment, the number of the connection cables can be reduced and the noise immunity performance can be improved.

Further, it is to be noted that it is not necessary to individually locate all the optical fibers and some of optical fibers may be branched or combined by means of the tee coupler or star coupler as occasion demands in view of cost reduction.

A still further embodiment of the process instrumentation apparatus according to the present invention will be described hereunder with reference to FIG. 11, in which like reference numerals are added to elements or circuits corresponding to those of the embodiment of FIGS. 7 and 8 and the explanation thereof is omitted herein.

Figure 11:
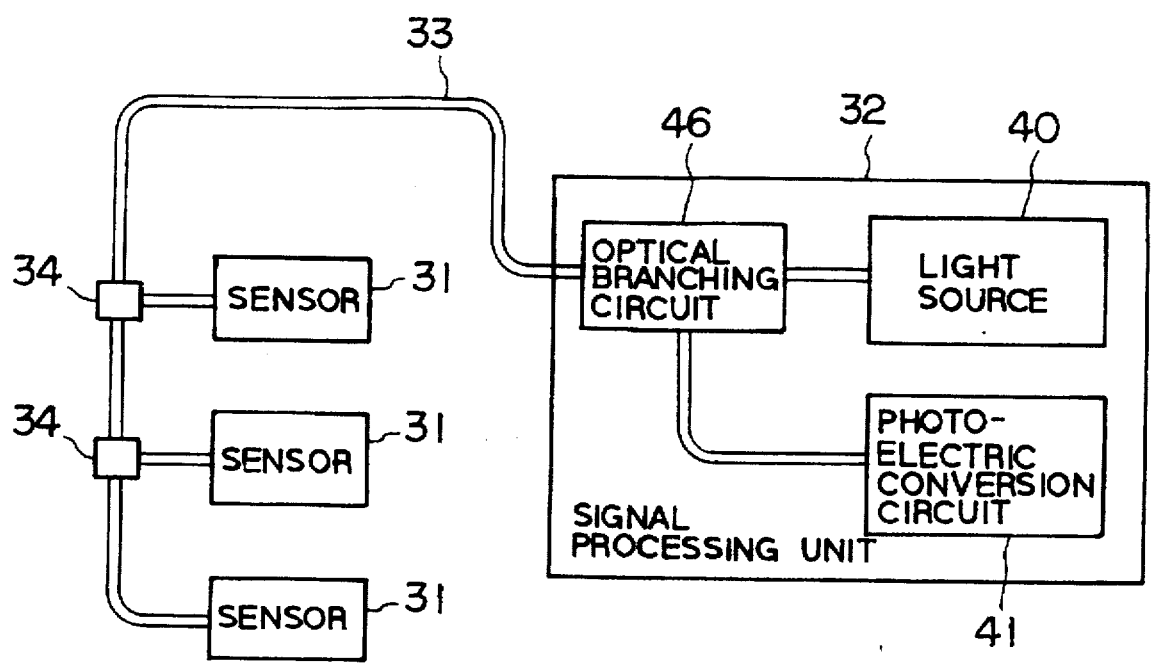
FIG. 11 is a block diagram showing a sixth embodiment of the process instrumentation apparatus of the present invention.
Figure 12:
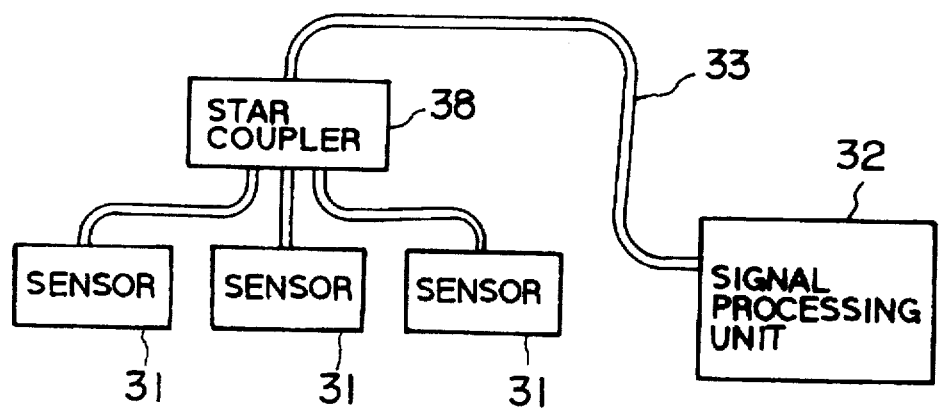
FIG. 12 is a block diagram showing a seventh embodiment of the process instrumentation apparatus of the present invention.

Referring to FIG. 11, the process instrumentation apparatus of this embodiment is provided with a plurality of reflection-optical-modulation-type sensors 31, which serve to convert the process quantities such as temperature and pressure into frequency signals and light supplied from an external means through the optical fiber 33 is modulated in intensity by the frequency signals and then transmitted again through the optical fiber 33.

The light fed from the light source 40 incorporated in the signal processing unit 32 is branched and supplied to the respective sensors 31 through the optical fiber 33 and the tee coupler 34. The sensors 31 serve to modulate the light in its intensity with the frequencies corresponding to the process quantities, and the modulated light is multiplexed through the tee coupler 34 and the optical fiber 33 and then transmitted again to the signal processing unit 32. The signal processing unit 32 may be connected, though not shown, with a process computer and a data display unit through a computer network.

The embodiment of the structure described above will attain the following function.

The light transferred through the optical fiber 33 is branched by means of the tee couplers 34 to the respective sensors 31 with equal light quantity. For this reason, it is desired to use the tee couplers 34 having branching ratios different from each other. The respective sensors 31 serve to convert the process quantities to frequencies different from each other, and the optical signals are outputted from the respective sensors 31 in directions reverse to that of light from the light sourse and then combined by the tee couplers 34 and transferred to the signal processing unit 32 through the optical fiber 33. In the signal processing unit 32, the optical signals are branched to an optical branching circuit 46 such as half mirror and then transferred to the photoelectric conversion circuit 41 to perform the photoelectric conversion.

According to this embodiment, since the optical-modulation type sensors are utilized in which the light-feeding and light-receiving are carried out by a single optical fiber through multi-point contacts, the connection cable is further reduced in comparison with the embodiment of FIGS. 7 and 8, and thus, the improved process instrumentation apparatus using less number of connection cables can be realized.

A still further embodiment of the process instrumentation apparatus according to the present invention will be described hereunder with reference to FIG. 13, in which like reference numerals are added to elements or circuits corresponding to those of the embodiment of FIGS. 7 and 8 and the explanation thereof is omitted herein.

Figure 13:
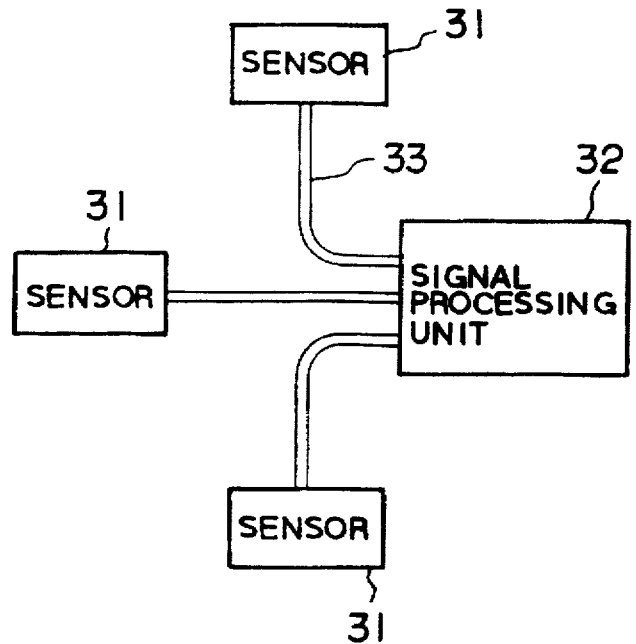
FIG. 13 is a block diagram showing an eighth embodiment of the process instrumentation apparatus of the present invention.

Referring to FIG. 13, the process instrumentation apparatus of this embodiment is provided with a plurality of optical-modulation-type sensors 31, in which the light-feeding and the light-receiving are carried out throuth a single optical fiber as mentioned with respect to the former embodiment of FIG. 11 and which serve to convert the process quantities such as temperature and pressure into frequency signals, by which the light fed from the external source is modulated in intensity and then outputted.

The light transferred from the light source 40 incorporated in the signal processing unit 32 is branched and supplied to the respective sensors separated in arrangement in a plant through the respective optical fibers 33. The sensors 31 serve to modulate the light in its intensity with the frequencies corresponding to the process quantities and then transmitted to the signal processing unit 32. The signal processing unit 32 may be connected, though not shown, with a process computer and a data display unit through a computer network as shown in FIG. 7.

In this embodiment of the characters described above, the light from the signal processing unit 32 is branched therein and then supplied to the sensors 31 respectively through the optical fibers 33 with equal quantity of light. In the respective sensors 31, the process quantities are converted into frequencies different from each other and the optical signals from the sensors 31 are transmitted to the signal processing unit 32, in which the optical signals are branched by the optical branching circuit 46 such as half mirror individually or the signals are once combined by the tee coupler or star coupler and then is branched by the half mirror, thereby converting the optical signals into electric signals.

In an arrangement in which the sensors 31 are separated in arrangement in a plant, when a connection system, in which the respective sensors 31 are connected in ladder shape or are connected through the star couplers, is adapted, there may cause a case where the length of the optical fiber is made long, and in such case, the radial connection system such as of this embodiment will be the most optimum system in view of cost involved.

According to this embodiment, in addition to the merit of the separate arrangement of the sensors 31 in the plant, the optical-modulation-type sensors, in which the light-feeding and the light-receiving are carried out though a single optical fiber through multi-point contacts, are used, so that the process instrumentation apparatus using further less numbers of connection cables can be realized in comparison with the embodiment of FIG. 10.

Further, it is to be noted that it is not necessary to individually locate all the optical fibers and some of optical fibers may be branched or combined for connection by means of the tee coupler or star coupler as occasion demands in view of total cost reduction.

A still further embodiment of the process instrumentation apparatus of the present invention will be described hereunder with reference to FIG. 14, in which like reference numerals are added to elements or circuits corresponding to those of the embodiment of FIGS. 7 and 8 and the explanation thereof is omitted herein.

Figure 14:
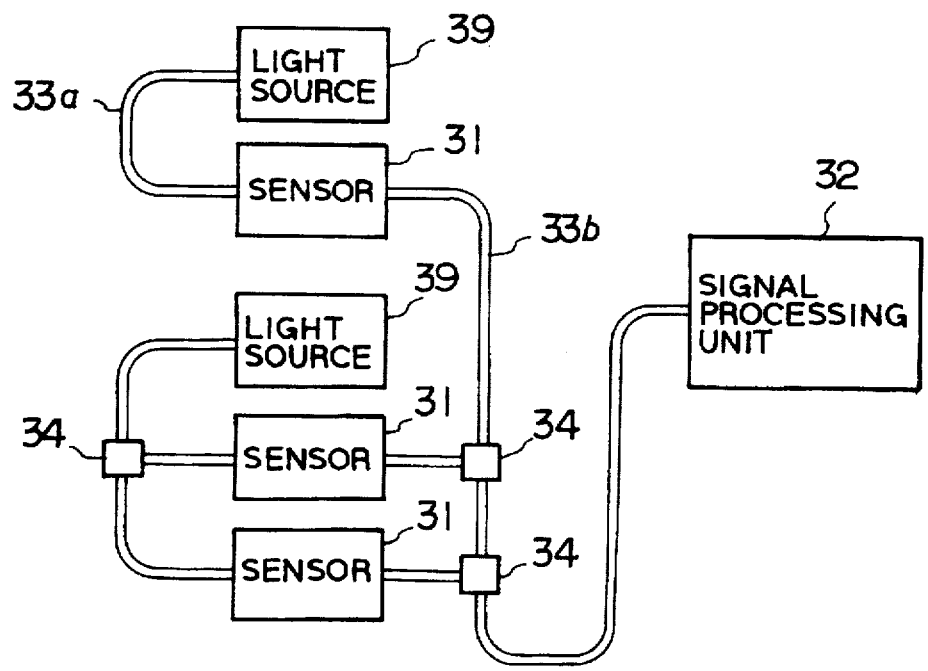
FIG. 14 is a block diagram showing a ninth embodiment of the process instrumentation apparatus of the present invention.

Referring to FIG. 14, the process instrumentation apparatus of this embodiment is provided with a plurality of optical-modulation-type sensors 31 as mentioned in the former embodiment, which serve to convert the process quantities such as temperature and pressure into frequency signals and transmit the light supplied from an external means with intensity modulated by the frequencies.

With reference to this embodiment of FIG. 14, a light source 39 is arranged in the vicinity of the sensors 31, and the light from the light source 39 is branched and supplied to the respective sensors 31 through the light-feed and light-receive optical fiber 33a, and tee couplers 34 as occasion demands. The sensors 31 serve to modulate the light in its intensity by the frequencies corresponding to the process quantities, and the modulated light is then multiplexed through the tee couplers 34 and the light-receive optical fiber 33b and then to transferred to the signal processing unit 32. The signal processing unit 32 may be connected, though not shown, with a process computer and a data display unit through a computer network as shown in FIG. 7.

According to this embodiment of the characters described above, the light from the light source 39 arranged in the vicinity of the sensors 31 is transferred through the light-feed optical fiber 33a, branched through the tee couplers 34 as occasion demands and then supplied to the respective sensors 31 with equal quantity of light. For this reason, the tee couplers 34 having branching ratios different from each other are used. The optical signals from the respective sensors 31 are combined by the tee couplers 34 and transmitted to the signal processing unit 32 through the light-receive optical fiber 33b.

When the optical-modulation-type sensors are used as sensors 31, d.c.light can be suppled to the sensors 31, so that only a power source is connected to the light source 39. Accordingly, when the power source is ensured and the light source 39 is arranged near the sensors 31, the length of the light-feed optical fiber 33a can be made short in comparison with a case where the lihgt-feed optical fiber 33a in connection with the singnal processing unit 32 is used.

According to the arrangement of this embodiment, since the light source 39 is arranged near the sensors 31, the proces instrumentation apparatus having less number of the connection cables can be realized in comparison with the embodiment of FIGS. 7 and 8.

According to the various embodiments of the process instrumentation apparatus according to the present invention of the characters described above, the following advantageous effects can be achieved.

The process quantities such as temperature and pressure are converted to the frequency signals having natural ranges and transmitted to the sensors as optical signals, and the process quantities measured in the sensors are calculated through the conversion amendment data. Thus, the sensor is free from such calculation, thus making simple electronic circuit system of the sensor.

In the arrangement of a plurality of sensors, the frequency signals may be multiplexed and transmitted, and further converted to the electric signals for the separation of the output signals from the respective sensors in accordance with the difference in frequencies. The number of the connection cables can be further reduced and the noise immunity performance can be improved in addition to the advantage mentioned above.

In the arrangement in which the respective sensors are connected through the light-feed optical fiber and the light-receive optical fiber by means of the optical waveguide copler, the optical signals can be effectively multiplexed and connected to the signal processing unit when the sensors are centeralized in arrangement.

In the arrangement in which the respective sensors are connected through the optical fiber to performing the light-feeding and light-receiving, and the tee couplers is arranged to branch the optical fiber for the connection to the respective sensors, less numbers of the optical fibers and the tee couplers are utilized for the multiplexing of the optical output signals to carry out the signal procesing.

In the arrangement in which the respective sensors are connected through the optical fiber to performing the light-feeding and light-receiving, and the optical waveguide circuit is arranged to branch the optical fiber for the connection to the respective sensors, less numbers of the optical fibers and the optical waveguide circuits are utilized for the multiplexing of the optical output signals to carry out the signal procesing. This is effectively applicable for the centeralized arrangement of the sensors.

The signal processing unit is connected to a host computer system through a computer network or to the data display unit. In such arrangement, a plurlaity of signal processing unit can be connected through single connection cable, thus reducing the number of the connection cables and the informations can be commonly utilized.

What is claimed is:

1. An optical-modulation-type sensor comprising
an input condenser lens for collecting light from a light source;
a polarizer for linearly polarizing the light from the input condenser lens;
a light-transmissive piezo-oscillator which is provided with an oscillator circuit and to which the linearly polarized light is introduced from the polarizer;
an analyzer for linearly polarizing the light from the piezo-oscillator; and
an output condenser lens for converging the linearly polarized light from the analyzer.

2. An optical-modulation-type sensor according to claim 1, further comprising a plurality of piezo-oscillators having different oscillation frequencies arranged between the polarizer and the analyzer.

3. An optical-modulation-type sensor according to claim 2, further comprising a wavelength plate arranged between the polarizer and the piezo-oscillators for circularly polarizing the linearly polarized light from the polarizer.

4. An optical-modulation-type sensor according to claim 1, wherein said light source is a laser light source for emitting a linearly polarized laser light to the piezo-oscillator through a polarization plane retaining fiber which retains polarization plane.

5. An optical-modulation-type sensor according to claim 4, wherein said light source is a laser light source for emitting a linearly polarized laser light to the piezo-oscillator through a polarization plane retaining fiber which retains polarization plane.

6. An optical-modulation-type sensor comprising:
an input condenser lens for collecting light from a light source;
a polarizer for linearly polarizing the light from the input condenser lens;
a light-transmissive piezo-oscillator which is provided with an oscillator circuit, said piezo-oscillator having a transmissive surface on one side thereof and a reflective surface on another side thereof;
an analyzer for linearly polarizing the light from the piezo-oscillator; and
an output condenser lens for converging the linearly polarized light from the analyzer.

7. An optical-modulation-type sensor according to claim 6, further comprising a plurality of light-transmissive piezo-oscillators having different oscillation frequencies arranged on a light input side of the piezo-oscillator.

8. An optical-modulation-type sensor according to claim 7, further comprising a wavelength plate arranged between the polarizer and the piezo-oscillators for circularly polarizing the linearly polarized light from the polarizer.

9. A process instrumentation apparatus comprising:
an optical-modulation-type sensor comprising an input condenser lens for collecting light from a light source, a polarizer for linearly polarizing the light from the input condenser lens, a light-transmissive piezo-oscillator which is provided with an oscillator circuit and to which the linearly polarized light is introduced from the polarizer, an analyzer for linearly polarizing the light from the piezo-oscillator, and an output condenser lens for converging the linearly polarized light from the analyzer;
an optical fiber for transmitting the light from the light source to the optical-modulation-type sensor;
a photoelectric converter operatively connected to an output side of the optical-modulation-type sensor for converting to an electrical signal the transmitted light which is intensity modulated with the oscillation frequency of the piezo-oscillator; and
a signal processing unit for acquiring a process quantity based on the frequency of an output signal from the photoelectric converter.

10. A process instrumentation apparatus according to claim 9, further comprising a plurality of tee couplers provided for the optical fiber and wherein a plurality of the optical-modulation-type sensors are arranged in parallel to each other and operatively connected to the tee couplers such that outputs from the optical-modulation-type sensors are superimposed.

11. A process instrumentation apparatus according to claim 9, wherein a plurality of the optical-modulation-type sensors having different oscillation frequencies are connected in series.

12. A process instrumentation apparatus comprising:
an optical-modulation-type sensor comprising an input condenser lens for collecting light from a light source, a polarizer for linearly polarizing the light from the input condenser lens, a light-transmissive piezo-oscillator which is provided with an oscillator circuit, said light-transmissive piezo-oscillator having a transmissive surface on one side thereof and a reflective surface on another side thereof, an analyzer for linearly polarizing the light from the piezo-oscillator, and an output condenser lens for converging the linearly polarized light from the analyzer;
an optical fiber for transmitting the light from the light source to the optical-modulation-type sensor;
a photoelectric converter operatively connected to an output side of the optical-modulation-type sensor for converting to an electrical signal the transmitted light which is intensity modulated with the oscillation frequency of the piezo-oscillator; and
a signal processing unit for acquiring a process quantity based on the frequency of an output signal from the photoelectric converter.

13. A process instrumentation apparatus according to claim 12, further comprising a plurality of tee couplers provided for the optical fiber and wherein a plurality of the optical-modulation-type sensors are arranged in parallel to each other and operatively connected to the tee couplers such that outputs from the optical-modulation-type sensors are superimposed.

14. A process instrumentation apparatus according to claim 12, wherein a plurality of the optical-modulation-type sensors having different oscillation frequencies are connected in series.

15. A process instrumentation apparatus comprising:
an optical-modulation-type sensor comprising an input condenser lens for collecting light from a light source, a polarizer for linearly polarizing the light received from the input condenser lens, a piezo-oscillator including a light-transmissive portion and an oscillator circuit, said light-transmissive portion receiving linearly polarized light introduced from the polarizer, an analyzer for linearly polarizing the light received from the light-transmissive portion, and an output condenser lens for converting the linearly polarized light received from the analyzer to provide an optical signal;
an optical fiber for transmitting the light from the light source to the input condenser lens of the optical-modulation-type sensor;
a photoelectric converter operatively connected to receive the optical signal from the output condenser lens and to convert the optical signal to an output electrical signal; and
a data conversion circuit operatively connected to the photoelectric converter for converting the output electrical signal from the photoelectric converter to a process quantity in response to conversion data provided from a conversion data source.

16. A process instrumentation apparatus comprising:
an optical-modulation-type sensor comprising an input condenser lens for collecting light from a light source, a polarizer for linearly polarizing the light received from the input condenser lens, a piezo-oscillator including a light-transmissive portion and an oscillator circuit, said light-transmissive portion having a transmissive surface on one side thereof and a reflective surface on another side thereof, an analyzer for linearly polarizing the light received from the light-transmissive portion, and an output condenser lens for converging the linearly polarized light from the analyzer to provide an optical signal;
an optical fiber for transmitting the light from the light source to the input condenser lens of the optical-modulation-type sensor;
a photoelectric converter operatively connected to receive the optical signal from the output condenser lens and to convert the optical signal to an output electrical signal; and
a data conversion circuit operatively connected to the photoelectric converter for converting the output electrical signal from the photoelectric converter to a process quantity in response to conversion data provided from a conversion data source.

17. A process instrumentation apparatus comprising:
a plurality of optical-modulation-type sensors each comprising an input condenser lens for collecting light from a light source, a polarizer for linearly polarizing the light received from the input condenser lens, a piezo-oscillator including a light-transmissive portion and an oscillator circuit, the light-transmissive portion receiving linearly polarized light introduced from the polarizer, an analyzer for linearly polarizing the light received from the light-transmissive portion, and an output condenser lens for converging the linearly polarized light received from the analyzer to provide an optical signal;

an optical fiber for multiplexing and transmitting each optical signal from each respective output condenser lens of each sensor to provide transmitted optical signals;

a photoelectric converter operatively connected to the optical fiber for receiving the transmitted optical signals and for converting the received optical signals to electrical signals having frequencies different from each other;

a frequency separation circuit operatively connected to the photoelectric converter for separating at least one of the electrical signals in accordance with the difference in the frequencies of the electrical signals; and a data conversion circuit operatively connected to the frequency separation circuit for converting the separated at least one electrical signal outputted from the frequency separation circuit to at least one process quantity in response to conversion data provided from a conversion data source.

18. A process instrumentation apparatus comprising:

a plurality of optical-modulation-type sensors each comprising an input condenser lens for collecting light from a light source, a polarizer for linearly polarizing the light received from the input condenser lens, a piezo-oscillator including a light-transmissive portion and an oscillator circuit, said light-transmissive portion having a transmissive surface on one side thereof and a reflective surface on another side thereof, an analyzer for linearly polarizing the light received from the light-transmissive portion, and an output condenser lens for converging the linearly polarized light from the analyzer to provide an optical signal;

an optical fiber for multiplexing and transmitting each optical signal received from each output condenser lens of each respective sensor to provide transmitted optical signals;

a photoelectric converter operatively converted to the optical fiber for receiving and converting the transmitted optical signals to electrical signals having frequencies different from each other;

a frequency separation circuit operatively connected to the photoelectric converter for separating at least one of the electrical signals in accordance with the difference in the frequencies of the electrical signals; and a data conversion circuit operatively connected to the frequency separation circuit for converting the separated at least one of the electrical signals outputted from the frequency separation circuit to at leasat one corresponding process quantity in response to conversion data provided from a conversion data source.

19. A process estimentation apparatus comprising:

a light source from which a light is emitted;

a light-feed optical fiber connected to the light source;

an optical-modulation-type sensor comprising an input condenser lens for collecting light from the light source through the light-feed optical fiber, a polarizer for linearly polarizing the light received from the input condenser lens, a piezo-oscillator including a light-transmissive portion and an oscillator circuit, said light-transmission portion receiving linearly polarized light introduced from the polarizer, art analyzer for linearly polarizing the light received from the light-transmissive portion, and art output condenser lens for converging the linearly polarized light received from the analyzer to provide an optical signal;

a light-receive optical fiber for transmitting the optical signal received from the output condenser lens of the optical-modulation-type sensor;

a photoelectric convertor operatively connected to the light-receive optical fiber for receiving and converting the transmitted optical signal to art electrical signal; and a data conversion circuit operatively connected to the photoelectric converter for converting the electrical signal outputted from the photoelectric converter to a process quantity in response to conversion data provided from a conversion data source.

20. A process instrumentation apparatus comprising:

a light source from which a light is emitted;

a light-feed optical fiber connected to the light source;

art optical-modulation-type sensor comprising art input condenser lens for collecting light from the light source through the light feed optical fiber, a polarizer for linearly polarizing the light received from the input condenser lens, a piezo-oscillator including a light-transmissive portion and an oscillator circuit, said light-transmissive portion having a transmissive surface on one side thereof and a reflective surface on another side thereof, an analyzer for linearly polarizing the light received from the light-transmissive portion, and an output condenser lens for converging the linearly polarized light received from the analyzer to provide an optical signal;

a light-receive optical fiber for transmitting the optical signal received from the output condenser lens of the optical-modulation-type sensor;

a photoelectric converter operatively connected to the light-receive optical fiber for receiving and converting the transmitted optical signal to an electrical signal; and a data conversion circuit operatively connected to the photoelectric converter for converting signal outputted from the photoelectric converter to a process quantity in response to conversion data provided from a conversion data source.

21. A process instrumentation apparatus comprising:

a light source from which a light is emitted;

a light-feed optical fiber connected to the light source;

a plurality of optical-modulation-type sensors each comprising an input condenser lens for collecting light from the light source through the light-feed optical fiber, a polarizer for linearly polarizing the light received from the input condenser lens, a piezo-oscillator including a light-transmissive portion and an oscillator circuit, said light-transmissive portion receiving linearly polarized light introduced from the polarizer, an analyzer for linearly polarizing the light received from the light-transmissive portion, and an output condenser lens for converging the linearly polarized light received from the analyzer to provide an optical signal;

a light-receive optical fiber for multiplexing and transmitting each optical signal received from each output condenser lens of each respective sensor to provide transmitted optical signals;

a photoelectric converter operatively connected to the light-receive optical fiber for receiving and converting the transmitted optical signals to electrical signals having frequencies different from each other;

a frequency separation circuit operatively connected to the photoelectric converter for separating at least one of the electrical signal in accordance with the differences in the frequencies of the electrical signals; and a data conversion circuit operatively connected to the frequency separation circuit for converting the separated at least one of the electrical signals outputted from the frequency separation circuit to at least one corresponding process quantity in response to conversion data provided from a conversion data source.

22. A process instrumentation apparatus according to claim 21, wherein said optical-modulation-type sensors are connected in parallel to each other through said light-feed optical fiber and said light-receive optical fiber.

23. A process instrumentation apparatus according to claim 21, wherein said optical-modulation-type sensors are arranged in parallel to each other at both ends thereof through said light-feed optical fibers to which an optical waveguide coupler is provided.

24. A process instrumentation apparatus comprising:

a light source from which a light is emitted;

a light-feed optical fiber connected to the light source;

a plurality of optical-modulation-type sensors each comprising an input condenser lens for collecting light from the light source through the light-feed optical fiber, a polarizer for linearly polarizing the light received from the input condenser lens, a piezo-oscillator including a light-transmissive portion and an oscillator circuit, said light-transmissive portion having a transmissive surface on one side thereof and a reflective surface on another side thereof, an analyzer for linearly polarizing light received from the light-transmission portion, and an output condenser lens for converging the linearly polarized light received from the analyzer to provide an optical signal;

a light-receive optical fiber for multiplexing and transmitting each optical signal received from each output condenser lens of each respective sensor to provide transmitted optical signals;

a photoelectric converter operatively connected to the light-receive optical fiber for receiving and converting the transmitted optical signals to electrical signals having frequencies different from each other;

a frequency separation circuit operatively connected to the photoelectric converter for separating at least one of the electrical signals in accordance with the differences in the frequencies of the electrical signals; and a data conversion circuit operatively connected to the frequency separation circuit for converting the separated at least one of electrical signals outputted from the frequency separation circuit to at least one corresponding process quantity in response to conversion data provided from a conversion data source.

25. A process instrumentation apparatus according to claim 24, wherein said optical-modulation-type sensors are connected in parallel to each other through said light-feed optical fiber and said light-receive optical fiber.

26. A process instrumentation apparatus according to claim 24, wherein said optical-modulation-type sensors are arranged in parallel to each other at both ends thereof through said light-feed optical fibers to which an optical waveguide coupler is provided.

27. A process instrumentation apparatus comprising:

an external light source;

an optical fiber for transmitting a light from the light source;

a plurality of reflection-optical-modulation-type sensors receiving the transmitted light through the optical fiber:

each sensor providing the light received from the optical fiber with a different intensity modulation dependent on a different predetermined frequency applied to each sensor and returning the intensity modulated light to the optical fiber as modulated optical signals, each different predetermined frequency corresponding to a different process quantity to be sensed;

an optical branching circuit provided for said optical fiber to branch the optical signals from the reflection-optical-modulation-type sensors being returned on the optical fiber to guide these optical signals to a photoelectric converter; and said photoelectric converter connected to said optical branching circuit receiving said optical signals and converting said received optical signals to electrical signals having frequencies different from each other.

28. A process instrumentation apparatus according to claim 27, wherein said reflection-optical-modulation-type sensors are arranged in parallel to each other at both ends thereof through said optical fibers to which an optical waveguide coupler is provided.

* * * * *